Figure 1:
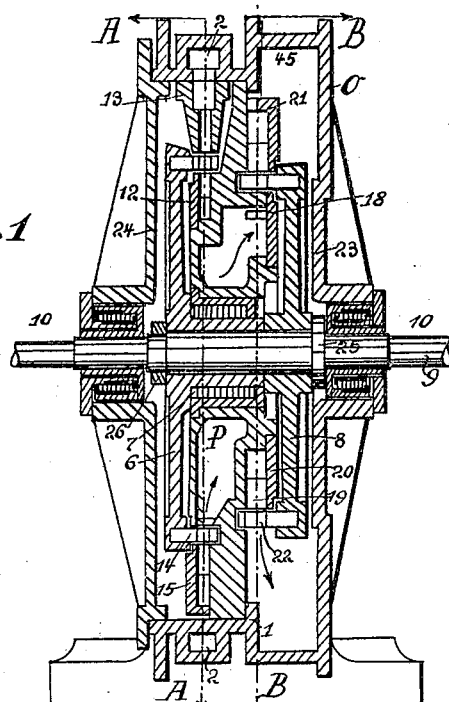

No. 808,094. PATENTED DEC. 26, 1905.
O. KOLB.
ELASTIC FLUID TURBINE.
APPLICATION FILED MAY 8, 1905.

5 SHEETS—SHEET 1.

Witnesses
E. Harrener
B. C. Rust

Inventor
Otto Kolb
By
Peter Furman Watson
Attorneys

No. 808,094.
PATENTED DEC. 26, 1905.
O. KOLB.
ELASTIC FLUID TURBINE.
APPLICATION FILED MAY 8, 1905.

5 SHEETS—SHEET 2.

Witnesses
E. Harrener
B. C. Rust

Inventor
Otto Kolb
By
Peter Freeman Watson
Attorneys

No. 808,094. PATENTED DEC. 26, 1905.
O. KOLB.
ELASTIC FLUID TURBINE.
APPLICATION FILED MAY 8, 1905.

5 SHEETS—SHEET 3.

No. 808,094. PATENTED DEC. 26, 1905.
O. KOLB.
ELASTIC FLUID TURBINE.
APPLICATION FILED MAY 8, 1905.

5 SHEETS—SHEET 4.

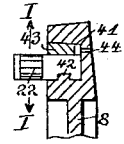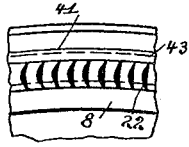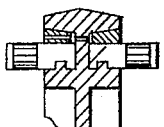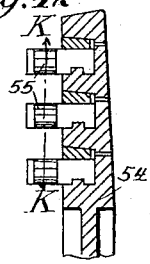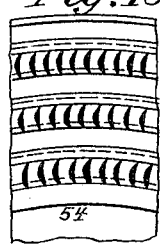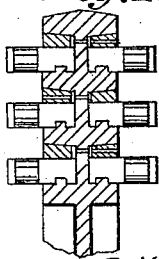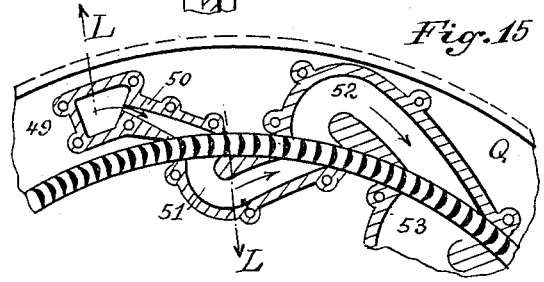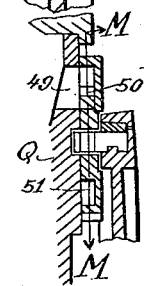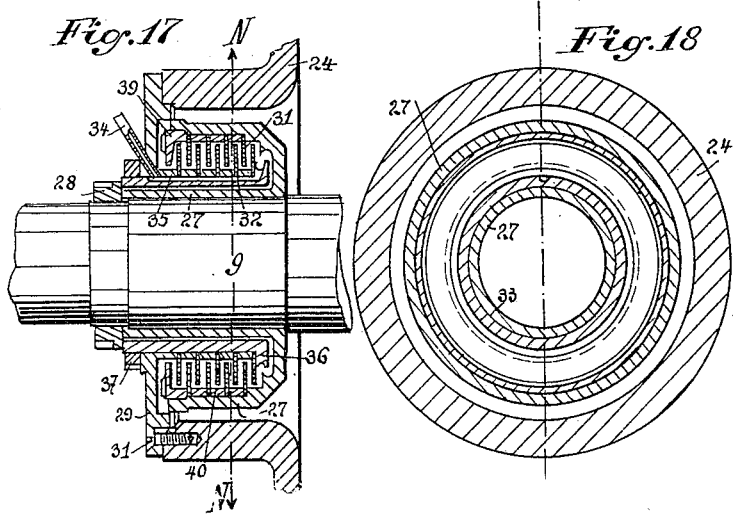

UNITED STATES PATENT OFFICE.

OTTO KOLB, OF KARLSRUHE, GERMANY.

ELASTIC-FLUID TURBINE.

No. 808,094.      Specification of Letters Patent.      Patented Dec. 26, 1905.

Application filed May 8, 1905. Serial No. 259,430.

*To all whom it may concern:*

Be it known that I, OTTO KOLB, a subject of the German Emperor, and a resident of Karlsruhe, Germany, have invented certain new and useful Improvements in Elastic-Fluid Turbines, of which the following is a specification.

My invention relates to improvements in elastic-fluid turbines whereby their manufacture is facilitated and cheapened, the turbines being of that kind in which two or more consecutive sections are employed and the elastic fluid is expanded in as many stages as there are sections and the speed of the expanded fluid is gradually reduced in each section. As is well known, such turbines are intended to make the most profit of the elastic fluid and to reduce the number of revolutions to a minimum.

The objects of my improvement are, first, to provide turned circular spaces in the casing; second, to provide circular plates, either hollow or solid, which can be fitted in the circular spaces of the casing for dividing the latter into a corresponding number of sections and are on either side or on both sides arranged for receiving cast pieces with conducting-channels or are cast in one piece with the walls of conducting-channels, which latter are closed by annular plates, or are provided on one side with a plurality of concentric grooves for the reception of detachable conducting-scoops; third, to arrange the expansion-nozzles in the several sections either for bolting to the inside of the casing or for fastening on the circular plates; fourth, to dispose a turbine-wheel with a single crown of scoops in each section or in every section with the exception of the last one, in which a turbine-wheel with several concentric crowns of scoops may be disposed, it being optional to provide the intermediate turbine-wheels on both sides with two single crowns of scoops; fifth, to make the scoops of the several turbine-wheels detachable and to arrange their cut-out feet for engaging in annular ribbed grooves, in which they can be secured by means of annular wedges, the latter being made either in one piece or in sections; sixth, to provide in each annular space between the turbine-shaft and the bottom or cover of the casing, also in each annular space between the nave of a turbine-wheel and a circular plate, a labyrinthian tightening device the rotary member of which has annular inwardly-open spaces, while the annular spaces of the stationary member are open outwardly, and, seventh, to preferably construct the labyrinthian tightening device with annular disks and distance-pieces or their equivalents, so as to avoid the division of the one member in a longitudinal plane of the turbine-shaft. I attain these objects by the constructions illustrated in the accompanying drawings, in which—

Figure 2:
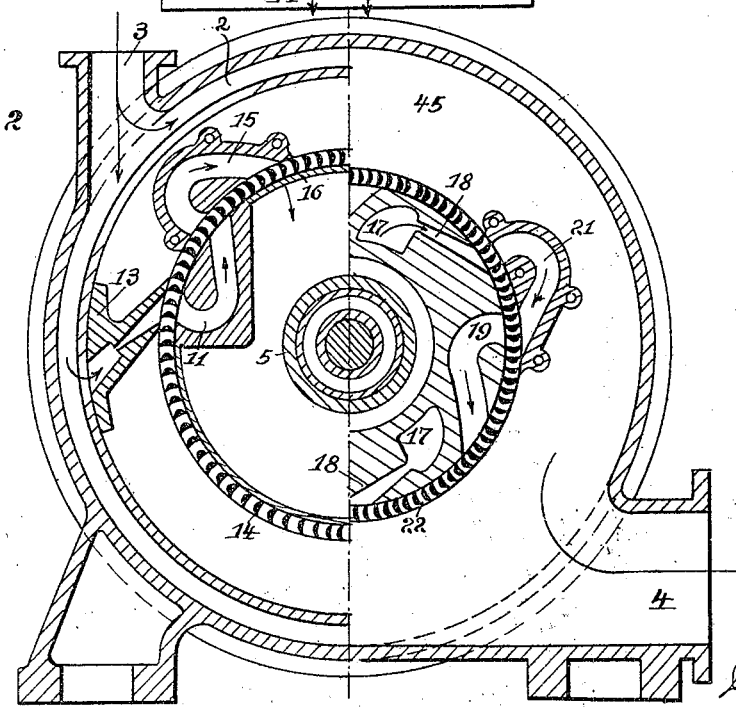
Figure 3:
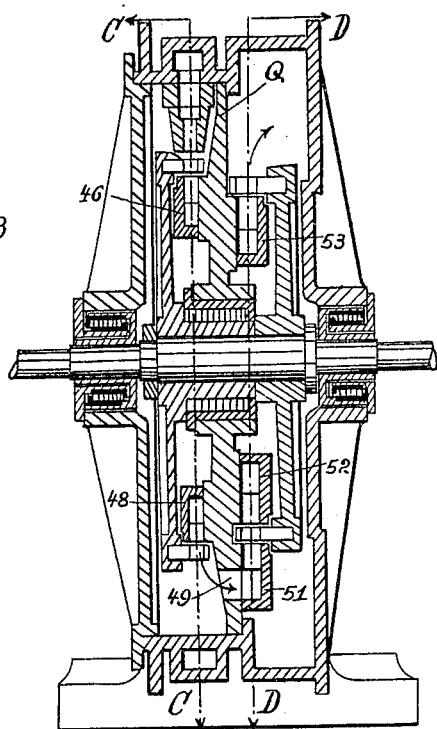
Figure 4:
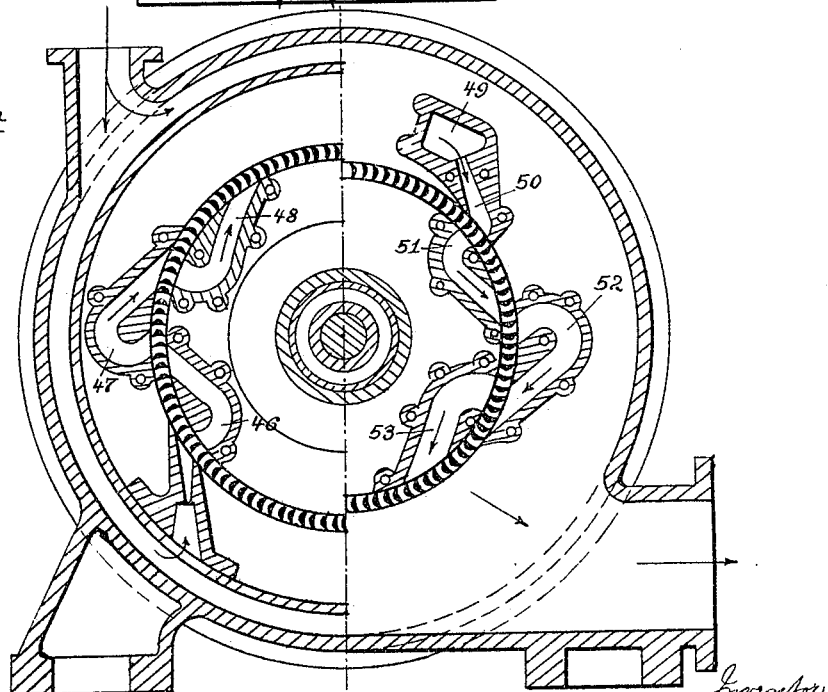
Figure 5:
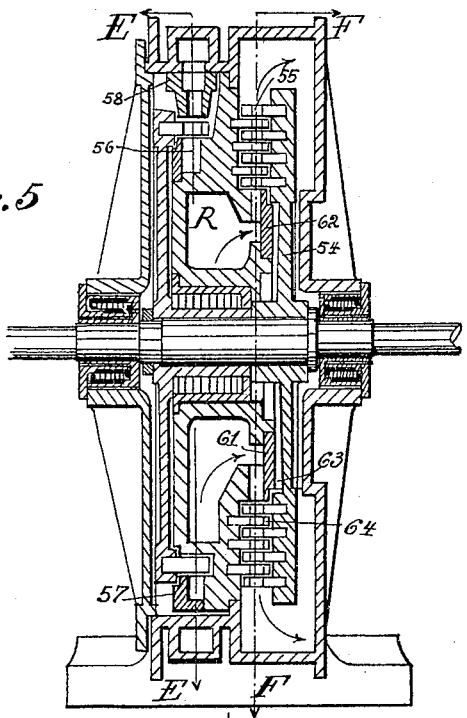
Figure 6:
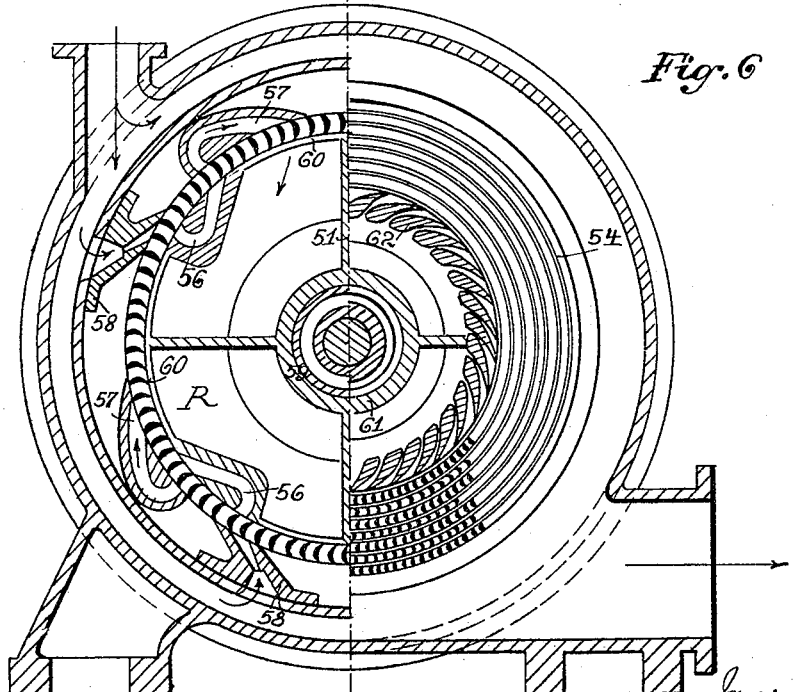
Figure 7:
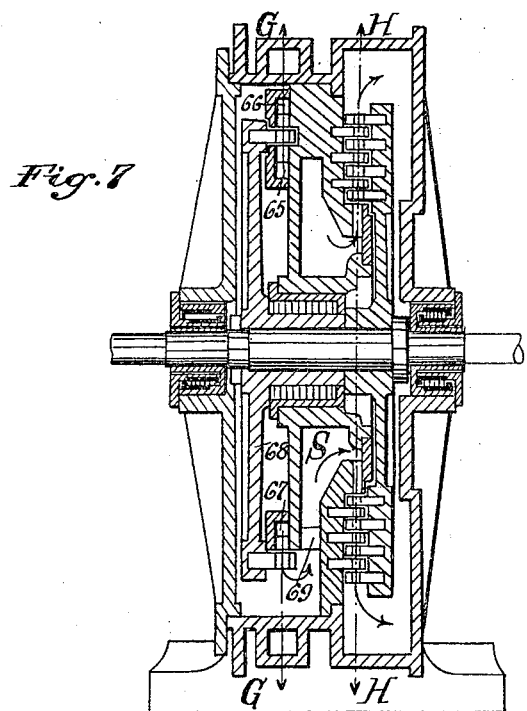
Figure 8:
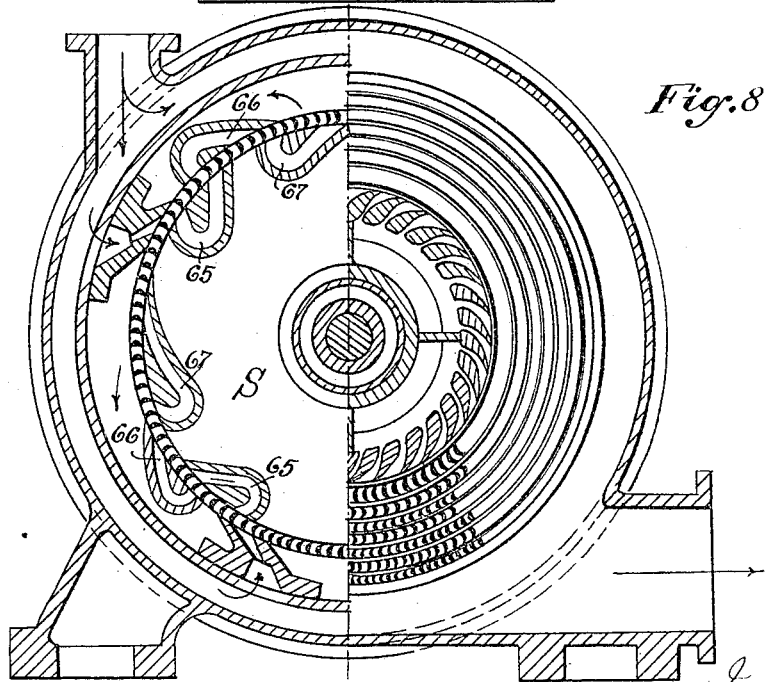

Figure 1 is a vertical longitudinal section through an elastic-fluid turbine in two sections and with the expansion-nozzles and conducting-channels arranged in one series in the first section and in three series in the second section, the circular plate being shown as hollow. Fig. 2 is on the left a vertical cross-section through the first section of the same on the line A A in Fig. 1 and on the right a similar section through the second section on the line B B in Fig. 1. Fig. 3 is a vertical longitudinal section through a modified elastic-fluid turbine in which the circular plate is solid. Fig. 4 is on the left a vertical cross-section through the first section of the same on the line C C in Fig. 3 and on the right a similar section through the second section on the line D D in Fig. 3. Fig. 5 is a vertical longitudinal section through another modified elastic-fluid turbine in two sections, of which the first section is similar to that in Fig. 1, while in the second section a circular series of expansion-nozzles and a turbine-wheel with a plurality of concentric crowns of scoops are disposed. Fig. 6 is on the left a vertical cross-section through the first section of the same on the line E E in Fig. 3 and on the right a similar section through the second section on the line F F in Fig. 3. Fig. 7 is a vertical longitudinal section through a modification of the previous elastic-fluid turbine. Fig. 8 is on the left a vertical cross-section through the first section of the same on the line G G in Fig. 7 and on the right a similar section through the second section on the line H H in Fig. 7. Fig. 9 is a cross-section through the rim of a turbine-wheel having on one side a single crown of detachable scoops. Fig. 10 is a section through the line I I in Fig. 9. Fig. 11 is a cross-section through the rim of a turbine-wheel having on both sides two single crowns of detachable scoops. Fig. 12 is a cross-section through the rim of a turbine-wheel having on one side three crowns of detachable scoops. Fig. 13 is a section through the line K K in Fig. 12. Fig. 14 is a cross-section through the rim of a turbine-wheel having on each side three crowns of detachable scoops. Fig. 15 is a section through the line M M in Fig. 16 and shows on an enlarged scale an expansion-nozzle and three conducting-channels, of which the last one is only partially represented, in a series and the scoops of a turbine-wheel. Fig. 16 is a section through the broken line L L in Fig. 15. Fig. 17 is a vertical longitudinal section through a labyrinthian tightening device similar to the left one in Figs. 1, 3, 5, and 7; and Fig. 18 is a section through the line N N in Fig. 17.

Similar characters of reference refer to similar parts throughout the several views.

In Figs. 1 to 8 elastic-fluid turbines with two sections are shown, in which the initial pressure of the elastic fluid (be it steam, gas, air, or the like) is in two stages reduced by expansion, and the speed of the fluid is in each section gradually reduced by passing it repeatedly through wheel-scoops and either through conducting-channels of increasing area or through consecutive concentric crowns of scoops or ladles of increasing area.

The casing O of the elastic-fluid turbine (shown at Figs. 1 and 2) is cast in one piece with an annular channel 2, to which the elastic fluid is admitted through the inlet 3, and with the outlet 4 of the second section. A hollow circular plate P is arranged in the casing o and bears against an internal flange 1 of the latter. In the center this hollow plate P is provided with an opening 5, into which the nave of the turbine-wheel 6 is introduced, while an annular space is left between this nave and the receiver. In this annular space a labyrinthian tightening device 7 is arranged, the construction of which is similar to that of the device shown at Figs. 17 and 18 and to be described later on. The left side of the hollow plate P in Fig. 1 is closed and arranged to engage in the space within the crown of scoops 14 of the turbine-wheel 6. The hollow plate P is on both sides provided with two annular grooves, in which the heads of the detachable scoops 14 and 22 of the two turbine-wheels 6 and 8, respectively, can engage. (*Vide* Fig. 16.) It will be seen that the hollow plate P is located between the two turbine-wheels 6 and 8 and divides the casing O into two sections. The shaft 9 is mounted to turn in two suitable bearings 10 10, which in Fig. 1 are merely indicated by lines, as their construction is immaterial. On the left side in Fig. 1 the hollow plate P is cast in one piece with the walls of the first conducting-channel 11, which is open to without and closed by a plate 12, so that the working of the inside faces of this channel 11 with the aid of tools may be facilitated. The expansion-nozzle 13 of the first section is secured, by means of screws, on the internal face of the casing O and is adapted to receive elastic fluid from the annular channel 2 through an opening and to expand the fluid, so as to reduce its pressure in the first stage, then to turn it on the scoops 14 of the first turbine-wheel 6. The second conducting-channel 15 of larger area is provided in a separate open cast piece, which is fastened with screws on the hollow plate P. Opposite to the end of this channel 15 the hollow plate P is provided with an opening 16 for the admission of the expanded and partly-spent elastic fluid. On the right side in Fig. 1 the hollow plate P is provided with three openings 17 17 and is cast in one piece with the walls of three expansion-nozzles 18 18 and three second conducting-channels 19 19 of the second section, which are all open to without and covered with an annular plate 20 for facilitating their working. The said three openings 17 17 are of course also closed by this plate 20. The three first conducting-channels 21 21 are formed in separate open cast pieces, which are fastened with screws on the right side of the hollow plate P in Fig. 1 and without the crown of scoops 22 of the second turbine-wheel 8. The annular spaces left between the bottom 23, the cover 24, and the shaft 9 are filled up with two labyrinthian tightening devices, as the one shown at Figs. 17 and 18, the construction of which will be presently described. The two turbine-wheels 6 and 8 are secured on the shaft 9 between a collar 25 and a nut 26 and may be prevented from turning on the shaft by one or two splines. (Not shown.)

The left labyrinthian tightening device in Fig. 1 and shown at Figs. 17 and 18 comprises a box 27 and a disk 30 29. The box 27 is secured on the shaft 9 between a shoulder (or the collar 25 for the right device in Fig. 1) and a nut 28. The disk 30 29 is fastened with screws 31 on the cover 24, (or the bottom 23.) The box 27 is in its cavity provided with a plurality of annular partition-walls 31 31, whereby a plurality of inwardly-open spaces is formed. In a similar manner the disk 29 30 is provided with a plurality of annular partition-walls 32 32, which alternate with the other ones 31 31 and form between them spaces which are outwardly open. It will be seen that the partition-walls 31 31 in the box 27 partake in the revolution of the turbine-wheels 6 and 8, while the other partition-walls 32 32 are stationary. For reducing the friction between the shaft 9 and the disk 29 30 an annular clearance 33 is left between the internal wall of the box 27 and the part 30 of the disk 29, while the nut 28 should just touch the part 30 without producing any pressure. Through a tube 34 in the disk 29 and a channel 35 a suitable liquid—such as water, oil, glycerin, anilin, or the like—is introduced, (be it by means of a pump or any known dropping lubricator,) so that during the rotation of the shaft 9 with the two turbine-wheels 6 and 8 this liquid partakes in the rotation and partly fills the spaces of the box 27 between the several partition-walls 31 32 31 32, as is clearly shown at Figs. 17 and 18. By means of this annular layer of liquid (which shape is due to its centrifugal force) the space within the casing O is hermetically divided from the ambient air. According to there being an overpressure or a vacuum within the casing O the annular layers of the liquid in the several chambers will adjust themselves, their depth varying from one side to the other side in proportion to the difference of the pressures within and without the turbine and to the number of the chambers. For a small difference of pressures a single chamber might suffice. In any case, even for a high difference of pressures, every stuffing-box and packing is rendered superfluous by this labyrinthian tightening device. I am aware that there are similar known labyrinthian tightening devices; but they are different from my improved tightening device in that with the former the member with the outwardly-open spaces (such as 30 32 32 in Fig. 17) is made to rotate, whereas with my device it is the other member with the inwardly-open spaces—that is, the box 27 with the partition-walls 31 31—which is made to rotate. Thereby the important advantage is obtained that the tightening liquid is securely held in the spaces of the box 27 and prevented from flowing off, as this is the case with the known devices by reason of the friction of the rotating partition-walls.

The box 27 may be made in one piece with its partition-walls 31 31 the same as the disk 27 30 with its partition-walls 32 32, in which case, however, the box 27 requires to be made in halves to facilitate the composition of the device.

To facilitate the manufacture and the composition of the labyrinthian tightening device, I prefer to make all the several partition-walls separately of sheet metal, as shown. Then the disk 29 is made separately; also, the sleeve 30, into which the channel 35 is cut. The several partition-disks 32 32 are secured on the sleeve 30, between the collar 36 and the nave of the disks 29, by means of a nut 37 and with the aid of annular distance-pieces 38 38. In a similar manner the several partition-disks 31 31 in the box 27 are, with the aid of annular distance-pieces 40 40, secured between a shoulder and a nut 39, screwed into the box and cast in one piece with a partition-wall. Then the composition of the device can be effected in a manner which is obvious to any one versed in the art to which this invention appertains.

In Fig. 1 the manner of affixing the scoops 14 and 22 to the two turbine-wheels 6 and 8 is not clearly shown, owing to the reduced scale on which this figure is drawn. It is better illustrated in Figs. 9 and 10. Each turbine-wheel 6 or 8 is provided along its periphery with an annular recess 41 of a trapezoid cross-section, in which an annular locking-rib 42 is left. All the scoops 14 or 22 are made from rolled or drawn or milled bars of a nearly rectangular cross-section, into which spaces are cut or milled to form the areas between the several scoops proper. They are each provided in the foot with a cut into which the locking-rib 42 can engage. To render possible the introduction of the feet of the scoops 14 or 22 into the annular recess 41 above the rib 42, the recess 41 of course requires to be made wider than the height of the scoops—that is to say, there should be a distance left between the rib 42 and the opposite face of the recess 41 which is equal to or slightly larger than the height of the scoop-feet. After introducing and collecting all the scoops 14 or 22 in the recess 41 there will be a space left into which an annular wedge 43 is driven to compress and secure the scoops 14 or 22. This wedge 43 may also be made in sections, as is clearly shown at Fig. 10. If so required, the wedge 43 or the respective section of it may be withdrawn by means of a hammer and a pin or peg introduced through holes 44. Thereby it is rendered possible to replace defective scoops by others in a very easy manner. The holes 44 may also be utilized for the introduction of bolts which engage in the wedges 43, if so preferred.

The elastic-fluid turbine operates as follows: The elastic fluid under pressure is admitted through the inlet 3 into the annular channel 2, from whence it passes through the nozzle 13 while being expanded, so that its pressure is reduced in the first stage. The expanded elastic fluid acts upon the scoops 14 to rotate the turbine-wheel 6, and thereby also the shaft 9. After passing through the scoops 14 for the first time the elastic fluid enters the first conducting-channel 11 and is therein turned and directed toward the scoops 14 in the direction of the arrow. It enters the turbine-wheel 6 at the inner circumference of the latter and acts for the second time upon the scoops 14, while its speed is of course further reduced. After the passage through the scoops 14 the elastic fluid enters the second conducting-channel 15 of a larger area, where it is again turned and directed toward the external periphery of the turbine-wheel 6. It then acts for the third time upon the scoops 14, while its speed decreases a little further. After the passage through the scoops 14 the elastic fluid enters the cavity of the hollow plate P through the opening 16 and leaves the same through the three openings 17 17, from whence it passes through the three expansion-nozzles 18 18, where it is expanded in the second stage. The expanded elastic fluid acts for the first time upon the scoops 22 of the second turbine-wheel 8, whereupon it enters the three first conducting-channels 21 21, where it is turned and directed toward the external periphery of the turbine-wheel. It then acts for the second time upon the scoops 22, while its speed is further reduced. After the passage through the scoops 22 the expanded elastic fluid is turned in the three second conducting-channels 19 19, so that it acts upon the scoops 22, after which it escapes into the annular space 45 and thence through the outlet 4 either into the atmosphere or into a condenser, as the case may be.

It will be noted that the diameter of the first turbine-wheel 6 is larger than that of the second turbine-wheel 8, which corresponds to the decrease of the speed of the elastic fluid on its path through the various parts of the turbine. It is evident that the number of the expansion-nozzles and the conducting-channels in both sections of the turbine may be varied.

In Figs. 1 and 2 I have shown a turbine with two sections only; but I do not limit myself to this number of sections. The turbine may be made in three sections, in which case three turbine-wheels on the common shaft and two hollow circular plates between them are employed. The manner in which the turbine requires to be modified is obvious after the above explanations. The number of sections of the turbine may be further increased, if so preferred. It is only to be remarked that the intermediate turbine-wheels may be provided on both sides with two single crowns of scoops, as is shown at Fig. 11, which requires no further explanation.

Where so preferred, the turbine shown at Figs. 1 and 2 may be modified in the manner shown at Figs. 3 and 4, in which case the hollow plate P is replaced by a solid plate Q, on both sides of which the several separate cast pieces containing the conducting-channels 46, 47, 48, 51, 52, and 53 are affixed with screws. (See also Figs. 15 and 16.) In the same manner also the expansion-nozzle 50 of the second section is affixed to the plate Q, in which latter an opening 49 is provided for the passage of the expanded elastic fluid from the first section to this nozzle 50. Otherwise the construction of the turbine is the same as before. It will be seen that also in this case the manufacture of the turbine is facilitated, as the plate Q is made separately and turned for the application of the several cast pieces. The turbine shown has only two sections; but it is evident that the number of the sections may be increased by inserting plates Q between the several turbine-wheels and making the casing in sections, the construction of the several parts being modified in a manner too obvious for further explanation.

The second turbine-wheel 8 in Figs. 1 and 2 may be replaced by a turbine-wheel 54 with a plurality of concentric crowns of scoops 55 55, (see Figs. 5, 6, 12, and 13,) the area between the scoops—that is, the length of the scoops proper—increasing from the inner circumference to the external periphery. The left side of the hollow plate R in Fig. 5 is arranged in a similar manner as that of the hollow plate P in Fig. 1 for receiving the conducting-channels 56 57. There are, however, four series of expansion-nozzles 58 and conducting-channels 56 57 assumed in the first section, and for this reason the cavity of the plate R is divided by four radial partition-walls 59 59 into four chambers, into each of which the expanded elastic fluid from the second conducting-channel 57 passes through a separate opening 60. On the right side in Figs. 5 and 6 the hollow plate R is shown as provided with an annular opening 61 and cast in one piece with the walls of a circular series of expansion-nozzles 62, which latter are open to without and covered with an annular plate 63. The said right side of the hollow plate R is provided with several (here three) concentric grooves similar to 41 in Fig. 9, in which as many series of scoops 64 64 are secured with wedges similar to 43 in Fig. 9. These scoops 64 64 serve as conducting-channels and engage in the spaces between the several concentric crowns of scoops 55 55 of the turbine-wheel 54. Otherwise the construction of this turbine is similar to that of the turbine shown at Figs. 1 and 2.

The turbine illustrated in Figs. 7 and 8 differs from the preceding turbine only in that three (instead of two) conducting-channels 65, 66, and 67 are employed in each series in the first section, so that the partly-spent elastic fluid leaves the turbine-wheel 68 on the external periphery instead of on the internal circumference as before. In consequence of this the hollow plate S is cut out on one or several places (in Fig. 7 below) and provided with one or several openings 69 69, through which the fluid can enter the cavity of the hollow plate S. On the right side in Fig. 7 the hollow plate S is constructed the same as before.

The turbines shown at Figs. 5 to 8 are divided into two sections only; but, as already remarked above, the number of the sections in each turbine may be increased, if so preferred, in which case hollow or solid plates R or S, respectively, are disposed between the several turbine-wheels, and the intermediate turbine-wheels may be provided on both sides with two single crowns of scoops, as shown at Fig. 11, or with several concentric crowns of scoops, as in Fig. 14.

The elastic-fluid turbines shown and described may be varied without deviating from the spirit of my invention.

The labyrinthian tightening device which is set forth but not claimed herein constitutes the subject-matter of my application, Serial No. 272,556, filed August 3, 1905, which is a division hereof.

What I claim as my invention, and desire to secure by Letters Patent, is—

1. In an elastic-fluid turbine, the combination with a casing having without at one end an inlet and an annular channel communicating therewith and at the other end an outlet and within a circular flange, of a circular plate secured at the circular flange of said casing and dividing the latter into two sections, detachable primary expansion-nozzles on the inside of said casing and communicating with its annular channel, a shaft, separate bearings for said shaft, two turbine-wheels on said shaft in both sections of said casing and having each on one side a crown of detachable scoops, the heads of which engage in concentric grooves of said circular plate, a plurality of detachable cast pieces fastened with screws on both sides of said circular plate and alternately on the two peripheries of the crown of the respective turbine-wheel, they partly containing conducting-channels of a uniform, but from channel to channel in either series increasing area and partly being expansion-nozzles which communicate with the first section through openings in the circular plate, a cover, and three labyrinthian tightening devices in the three annular spaces between said shaft and said casing and said cover, also beween the nave of either turbine-wheel and said circular plate.

2. In an elastic-fluid turbine, the combination with a casing having without at one end an inlet and an annular channel communicating therewith and at the other end an outlet and within a plurality of circular flanges, of a plurality of circular plates secured at the circular flanges of said casing and dividing the latter into sections, detachable primary expansion-nozzles on the inside of said casing and communicating with its annular channel, a shaft, separate bearings for said shaft, a plurality of turbine-wheels on said shaft, one of them in each section of said casing and all having each on one side a crown of detachable scoops, the heads of which engage in concentric grooves of said plurality of circular plates, a plurality of detachable cast pieces fastened with screws on both sides of the first of said plurality of circular plates and on one side of each of the following circular plates and alternately on the two peripheries of the crown of the respective turbine-wheel, they partly containing conducting-channels of a uniform, but from channel to channel in either series increasing area and partly being expansion-nozzles which communicate with the adjoining section through openings in the circular plate, two covers, two labyrinthian tightening devices in the annular spaces between said shaft and said two covers, and a plurality of labyrinthian tightening devices in the annular spaces between said plurality of circular plates and the naves of said plurality of turbine-wheels.

3. In an elastic-fluid turbine, the combination with a casing having without at one end an inlet and an annular channel communicating therewith and at the other end an outlet and within a circular flange, of a hollow circular plate secured at the circular flange of said casing and dividing the latter into two sections, detachable primary expansion-nozzles on the inside of said casing and communicating with its annular channel, a shaft, separate bearings for said shaft, two turbine-wheels on said shaft in both sections of said casing and having each on one side a crown of detachable scoops, the heads of which engage in concentric grooves of said hollow circular plate, the latter being arranged for the passage of the elastic fluid from the first section to the second section and being cast in one piece on the one side with the walls of a plurality of conducting-channels within the crown of the first turbine-wheel which channels are open to without and on the other side with the walls of a plurality of expansion-nozzles and conducting-channels within the crown of the second turbine-wheel which nozzles and channels are open to without, two annular plates covering the expansion-nozzles and conducting-channels in said hollow circular plate, a plurality of detachable cast pieces with conducting-channels fastened with screws on both sides of said hollow circular plate without the crowns of said two turbine-wheels, a cover, and three labyrinthian tightening devices in the annular spaces between said shaft and said casing and said cover, also between the nave of either turbine-wheel and said hollow circular plate.

4. In an elastic-fluid turbine, the combination with a casing having without at one end an inlet and an annular channel communicating therewith and at the other end an outlet and within a plurality of circular flanges, of a hollow circular plate secured at the first circular flange of said casing, a plurality of circular plates at the remaining circular flanges of said casing whereby the latter is divided into sections, detachable primary expansion-nozzles on the inside of said casing and communicating with its annular channel, a shaft, separate bearings for said shaft, a plurality of turbine-wheels on said shaft, one of them in each section of said casing and all having each on one side a crown of detachable scoops, the heads of which engage in concentric grooves of said hollow circular plate and said plurality of circular plates respectively, said hollow circular plate being cast in one piece on the one side with the walls of a plurality of conducting-channels within the crown of the first turbine-wheel which channels are open to without and on the other side with the walls of a plurality of expansion-nozzles and conducting-channels within the crown of the second turbine-wheel which nozzles and channels are open to without, two annular plates covering the expansion-nozzles and conducting-channels in said hollow circular plate which latter is arranged for the passage of the elastic fluid from the first section to the second section, a plurality of detachable cast pieces with conducting-channels fastened with screws on both sides of said hollow circular plate without the crowns of the first and second turbine-wheels, a plurality of detachable cast pieces fastened with screws on one side of each of said plurality of circular plates and alternately on the two peripheries of the crown of the respective turbine-wheel, they partly containing conducting-channels of a uniform, but from channel to channel in either series increasing area and partly being expansion-nozzles, which communicate with the adjoining section through openings in the circular plate, two covers, two labyrinthian tightening devices in the annular spaces between said shaft and said two covers, and a plurality of labyrinthian tightening devices in the annular spaces between said hollow circular plate and said plurality of circular plates and the naves of said plurality of turbine-wheels.

5. In an elastic-fluid turbine, the combination with a casing having without at one end an inlet and an annular channel communicating therewith and at the other end an outlet and within a plurality of circular flanges, of a plurality of hollow circular plates secured at the circular flanges of said casing and dividing the latter into sections, detachable primary expansion-nozzles on the inside of said casing and communicating with its annular channel, a shaft, separate bearings for said shaft, a plurality of turbine-wheels on said shaft, one of them in each section of said casing and the first and the last of them having each on one side a crown of detachable scoops and the others having each on both sides two crowns of detachable scoops, the heads of all these detachable scoops engaging in concentric grooves of said plurality of hollow circular plates, the latter being arranged for the passage of the elastic fluid from one to the following section and being each cast in one piece on the one side with the walls of conducting-channels within the crown of the respective turbine-wheel which channels are open to without and on the other side with the walls of a plurality of expansion-nozzles and conducting-channels within the crown of the respective turbine-wheel which nozzles and channels are open to without, a plurality of annular plates covering the expansion-nozzles and conducting-channels in said plurality of hollow circular plates, a plurality of detachable cast pieces with conducting-channels fastened with screws on both sides of each of said plurality of hollow circular plates without the crowns of said plurality of turbine-wheels, two covers, two labyrinthian tightening devices in the annular spaces between said shaft and said two covers, and a plurality of labyrinthian tightening devices in the annular spaces between said plurality of hollow circular plates and the naves of said plurality of turbine-wheels.

6. In an elastic-fluid turbine, the combination with a casing having without at one end an inlet and an annular channel communicating therewith and at the other end an outlet and within a circular flange, of a hollow circular plate secured at the circular flange of said casing and dividing the latter into two sections, detachable primary expansion-nozzles on the inside of said casing and communicating with its annular channel, a shaft, separate bearings for said shaft, a first turbine-wheel on said shaft in the first section of said casing and having on one side a crown of detachable scoops which with their heads engage in a concentric groove of said hollow circular plate, a second turbine-wheel on said shaft in the second section of said casing and having on one side a plurality of concentric crowns of detachable scoops, the heads of which engage in concentric grooves of said hollow circular plate, the latter being arranged for the passage of the elastic fluid from the first section to the second section and being cast in one piece on the one side with the walls of a plurality of conducting-channels within the crown of said first turbine-wheel which channels are open to without and on the other side with the walls of a circular series of expansion-nozzles within the inner crown of said second turbine-wheel which nozzles are open to without, two annular plates covering the conducting-channels and expansion-nozzles in said hollow circular plate, a plurality of detachable cast pieces with conducting-channels fastened with screws on one side of said hollow circular plate without the crown of said first turbine-wheel, a plurality of concentric deep grooves in the other side of said hollow circular plate, a plurality of concentric crowns of detachable conducting-scoops engaging in the spaces between the concentric crowns of scoops of the second turbine-wheel and fastened with their feet in said plurality of concentric deep grooves, and three labyrinthian tightening devices in the three annular spaces between said shaft and said casing and said cover, also between the nave of either turbine-wheel and said hollow circular plate.

7. In an elastic-fluid turbine, the combination with a casing having without at one end an inlet and an annular channel communicating therewith and at the other end an outlet and within a plurality of circular flanges, of two hollow circular plates secured at the first and the last circular flanges of said casing, a plurality of circular plates secured at the remaining circular flanges of said casing, whereby the latter is divided into sections, detachable primary expansion-nozzles on the inside of said casing and communicating with its annular channel, a shaft, separate bearings for said shaft, a plurality of turbine-wheels on said shaft, one of them in each section of said casing and all excepting the last one having each on one side a crown of detachable scoops, while the last turbine-wheel has on one side a plurality of concentric crowns of detachable scoops, the heads of all these scoops engaging in concentric grooves of said two hollow circular plates and said plurality of circular plates respectively, the one hollow circular plate being cast in one piece on the one side with the walls of a plurality of conducting-channels within the crown of the first turbine-wheel which channels are open to without and on the other side with the walls of a plurality of expansion-nozzles and conducting-channels within the crown of the second turbine-wheel which nozzles and channels are open to without, the other hollow circular plate being cast in one piece on the one side with the walls of a plurality of conducting-channels within the crown of the last but one turbine-wheel which channels are open to without and on the other side with the walls of a circular series of expansion-nozzles within the inner crown of the last turbine-wheel which nozzles are open to without, four annular plates covering the conducting-channels and expansion-nozzles in said two hollow circular plates, the latter being arranged for the passage of the elastic fluid from one to the following section, a plurality of detachable cast pieces with conducting-channels fastened with screws on both sides of the one and on one side of the other of said two hollow circular plates without the crown of the respective turbine-wheel, a plurality of concentric deep grooves in the other side of the other hollow circular plate, a plurality of concentric crowns of detachable conducting-scoops engaging in the spaces between the concentric crowns of scoops of the last turbine-wheel and fastened with their feet in the plurality of concentric deep grooves of the last hollow circular plate, a plurality of detachable cast pieces fastened with screws on one side of each of said plurality of circular plates and alternately on the two peripheries of the crown of the respective turbine-wheel, they partly containing conducting-channels of a uniform, but from channel to channel in either series increasing area and partly being expansion-nozzles, which communicate with the adjoining section through openings in the circular plate, two covers, two labyrinthian tightening devices in the annular spaces between said shaft and said two covers, and a plurality of labyrinthian tightening devices in the annular spaces between said two hollow circular plates and said plurality of circular plates and the naves of said plurality of turbine-wheels.

8. In an elastic-fluid turbine, the combination with a casing having without at one end an inlet and an annular channel communicating therewith and at the other end an outlet and within a plurality of circular flanges, of a plurality of hollow circular plates secured at the circular flanges of said casing, whereby the latter is divided into sections, detachable primary expansion-nozzles on the inside of said casing and communicating with its annular channel, a shaft, separate bearings for said shaft, a plurality of turbine-wheels on said shaft, one of them in each section of said casing, of which the first turbine-wheel has on one side a crown of detachable scoops, the last turbine-wheel has on one side a plurality of concentric crowns of detachable scoops and the remaining turbine-wheels have each on both sides two crowns of detachable scoops, the heads of all these scoops engaging in concentric grooves of said plurality of hollow circular plates, the first hollow circular plate being cast in one piece on the one side with the walls of a plurality of conducting-channels within the crown of the first turbine-wheel which channels are open to without and on the other side with the walls of a plurality of expansion-nozzles and conducting-channels within the crown of the second turbine-wheel which nozzles and channels are open to without, the remaining hollow circular plates being cast in one piece on both sides with the walls of two circular series of expansion-nozzles within the inner crowns of the turbine-wheels which nozzles are open to without, a plurality of annular plates covering the conducting-channels and the expansion-nozzles respectively in said plurality of hollow circular plates, the latter being arranged for the passage of the elastic fluid from one to the following section, a plurality of detachable cast pieces with conducting-channels fastened with screws on the one side of the first hollow circular plate without the crown of the first turbine-wheel, a plurality of concentric deep grooves in the other side of the first hollow circular plate and in each side of the remaining hollow circular plates, a plurality of concentric crowns of detachable conducting-scoops engaging in the spaces between the concentric crowns of scoops of the last turbine-wheel and fastened with their feet in the plurality of concentric deep grooves of said plurality of hollow circular plates, two labyrinthian tightening devices in the annular spaces between said shaft and said two covers, and a plurality of labyrinthian tightening devices in the annular spaces between said plurality of hollow circular plates and the naves of said plurality of turbine-wheels.

9. In an elastic-fluid turbine, the combination with a turbine-wheel provided on one side along its periphery with an annular groove of a trapezoid cross-section and an annular rib on the internal face of this groove, of a plurality of detachable scoops made from rolled, drawn or milled bars of a nearly rectangular cross-section and provided in their feet each with a cut, in which the rib in the groove of said turbine-wheel can engage, and an annular wedge for securing the feet of said plurality of detachable scoops in the groove of said turbine-wheel.

10. In an elastic-fluid turbine, the combination with a turbine-wheel provided on both sides along its periphery with two annular grooves of a trapezoid cross-section and two annular ribs on the internal faces of these two grooves, of a plurality of detachable scoops made from rolled, drawn or milled bars of a nearly rectangular cross-section and provided in their feet each with a cut, in which the rib in either groove of said turbine-wheel can engage, and two annular wedges for securing the feet of said plurality of detachable scoops in the two grooves of said turbine-wheel.

11. In an elastic-fluid turbine, the combination with a turbine-wheel provided on one side with a plurality of concentric grooves of a trapezoid cross-section and with an annular rib on the internal face of each of these grooves, of a plurality of detachable scoops made from rolled, drawn or milled bars of a nearly rectangular cross-section and provided in their feet each with a cut, in which the rib in either groove of said turbine-wheel can engage, and a plurality of annular wedges for securing the feet of said plurality of detachable scoops in the several grooves of said turbine-wheel.

12. In an elastic-fluid turbine, the combination with a turbine-wheel provided on both sides with a plurality of concentric grooves of a trapezoid cross-section and with an annular rib on the internal face of each of these grooves, of a plurality of detachable scoops made from rolled, drawn or milled bars of a nearly rectangular cross-section and provided in their feet each with a cut, in which the rib in either groove of said turbine-wheel can engage, and a plurality of annular wedges for securing the feet of said plurality of detachable scoops in the several grooves of said turbine-wheel.

13. In an elastic-fluid turbine, the combination with a turbine-wheel, provided on one side near its periphery with an annular groove and an annular rib in said groove, of a crown of detachable scoops provided in their feet each with a cut, and an annular wedge made in sections for securing the feet of said scoops in said grooves.

In testimony whereof I have signed my name to this specification in the presence of two subscribing witnesses.

OTTO KOLB.

Witnesses:
FROOEFF R. GUNDEL,
JOS. H. LEUTE.